June 15, 1948.  D. B. DOOLITTLE  2,443,308
AIRCRAFT LAUNCHING SYSTEM
Filed Nov. 16, 1945  13 Sheets-Sheet 1

Fig. 1

INVENTOR
DONALD BEACH DOOLITTLE
BY
ATTORNEY witness:
Sarah Street

June 15, 1948.  D. B. DOOLITTLE  2,443,308
AIRCRAFT LAUNCHING SYSTEM
Filed Nov. 16, 1945  13 Sheets-Sheet 3

Fig. 4
Fig. 5

INVENTOR
DONALD BEACH DOOLITTLE
BY
Hyde W. Ballard
ATTORNEY

Witnesses:
Sarah Street

June 15, 1948.  D. B. DOOLITTLE  2,443,308
AIRCRAFT LAUNCHING SYSTEM
Filed Nov. 16, 1945  13 Sheets-Sheet 5

INVENTOR
DONALD BEACH DOOLITTLE
BY
Hyde W. Ballard
ATTORNEY witnesses:
Sarah Street
Ann H. Backus

Fig. 12

June 15, 1948. D. B. DOOLITTLE 2,443,308
AIRCRAFT LAUNCHING SYSTEM
Filed Nov. 16, 1945 13 Sheets-Sheet 8

INVENTOR
DONALD BEACH DOOLITTLE
BY
Hyde W. Ballard
ATTORNEY

June 15, 1948.  D. B. DOOLITTLE  2,443,308
AIRCRAFT LAUNCHING SYSTEM
Filed Nov. 16, 1945  13 Sheets-Sheet 13

INVENTOR
DONALD BEACH DOOLITTLE
BY
Hyde W. Ballard
ATTORNEY

Patented June 15, 1948

2,443,308

UNITED STATES PATENT OFFICE 2,443,308

AIRCRAFT LAUNCHING SYSTEM

Donald Beach Doolittle, Earleville, Md., assignor to All American Aviation, Inc., Wilmington, Del., a corporation of Delaware Application November 16, 1945, Serial No. 629,128

10 Claims. (Cl. 244—63)

My invention relates to air pick-up and launching systems and more particularly to ground based devices for accelerating an object to be picked up.

For the purpose of explaining the nature of my invention, air pick-up systems may be classified roughly into two categories. The first class is that in which the object to be picked up is accelerated by stored or potential energy. The catapault is an example of this type. The second class may be called the energy transfer or kinetic energy type in which the kinetic energy of an aircraft in flight is utilized to impart velocity to the object to be picked up. Examples of this second class employ energy dissipating or absorbing mechanisms, which in effect control the rate of transfer of energy and maintain this rate of transfer within limits which will not damage the equipment. Both the potential energy type and the kinetic energy type require complicated and expensive mechanisms either on the ground or in the aircraft.

My invention is a radical departure from previous practice and in some respects may be considered a combination of a catapult and an energy transferring device, although it is primarily an energy transfer device.

The effective utilization of this kinetic energy without substantial loss through energy absorption or dissipation devices is, therefore, a fundamental object of my invention. This object may be accomplished in a variety of ways by means of a system of pulleys and cables arranged so that a cable span of any desired length is substantially perpendicular to the flight path of the aircraft while another part of the cable is attached to the object to be accelerated and arranged in such a manner that the object will move in a path approximately parallel to the flight path of the aircraft. Such a system eliminates the necessity for complicated and heavy accelerating or energy absorbing mechanisms and requires only a minimum of equipment. As will be fully disclosed hereinafter, any desired initial and final velocity of the accelerated object may be obtained by suitable interrelation and positioning of the parts.

An object of my invention, therefore, is to accelerate an object on the ground by means of a system of cables, pulleys and an aircraft in flight.

A further object of my invention is to provide a span which may be actuated by an aircraft in flight.

A further object of my invention is to increase the payload of a pick-up aircraft by eliminating energy expending and absorbing devices in the pick-up aircraft.

A further object of my invention is to provide a pick-up system having acceleration control characteristics which vary over a wide range.

A further object is to provide pick-up equipment having acceleration characteristics which are substantially independent of the weight of the object being accelerated.

A further object of my invention is to provide a plurality of cable spans for controlling the initial, intermediate, and final velocity of the article being accelerated, each span acting independently or in cooperation with the other spans.

A still further object is to provide a method of launching a glider from a stationary position by means of ground based energy imparting devices.

Further objects will be apparent from the specification and drawings in which.

Like reference characters denote like parts in the several figures of the drawings.

While certain novel features of the invention are disclosed herein with considerable detail with respect to certain particular forms of the invention, it is not desired to be limited to such details since many changes and modifications may well be made without departure from the spirit of the invention in its broadest aspect.

Basically, my launching device comprises a group of spaced pulleys securely stationed on the ground and adapted to carry a system of wires and cables.

The preferred arrangement of cables and pulleys, as illustrated in Figs. 1 to 5, consists of an endless cable 37 passing around stationary pulleys 38, 39, 40; and cable 41 passing around pulley 42 and attached at one end to cable 37. One portion of cable 37 is attached to the nose of a glider 43 by means of a short leader 44 and a standard glider release (not shown) but located at 45 in Fig. 1. It is believed unnecessary for the purposes of this disclosure to describe in detail the structure of a glider release, since this device is well known to the art and is supplied as standard equipment on all gliders. See patent to Chanute, No. 834,658 and patents to Lobelle, Nos. 2,333,621 and 2,342,351.

The proper relationship of the pulleys, cable, and aircraft will be explained in considerable detail hereinafter, and it will be appreciated that an extremely wide range of characteristics may be obtained by varying one or more of the elements of the ground equipment with respect to the other elements.

Figure 1:
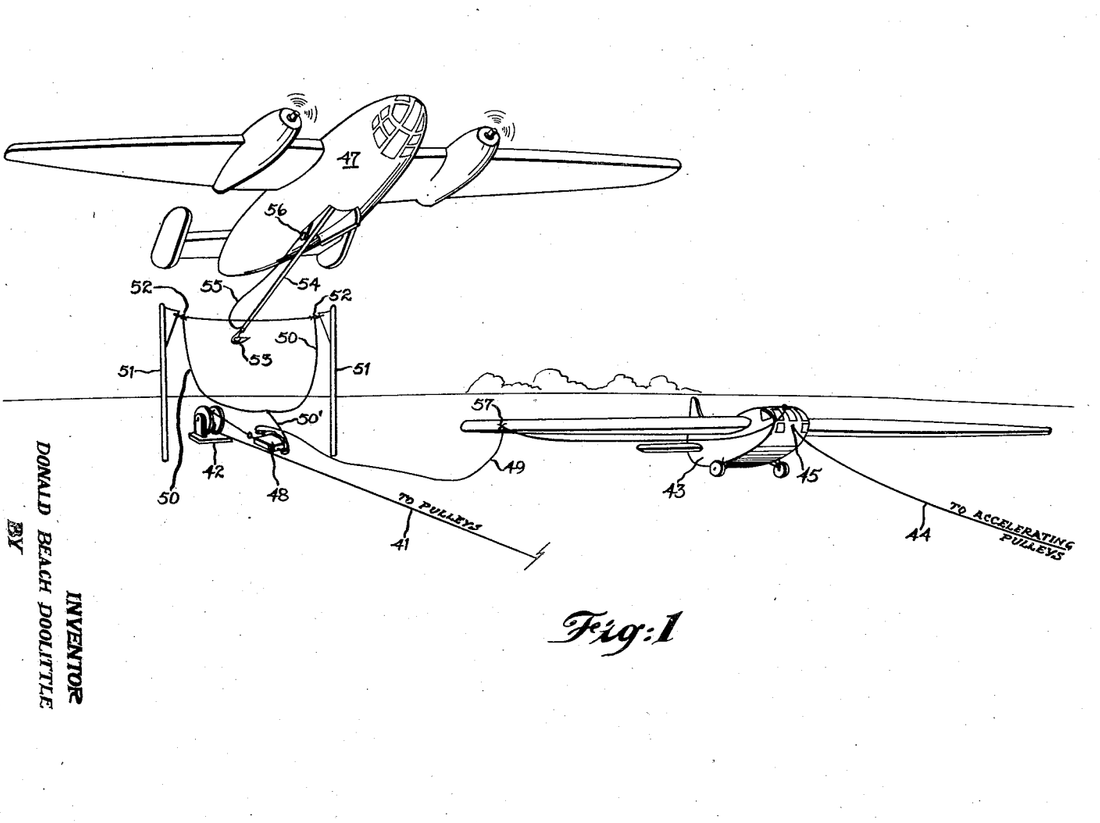
Fig. 1 shows the station details and relative location of the ground station and glider in a glider pick-up system according to my invention.
Figures 2, 3:
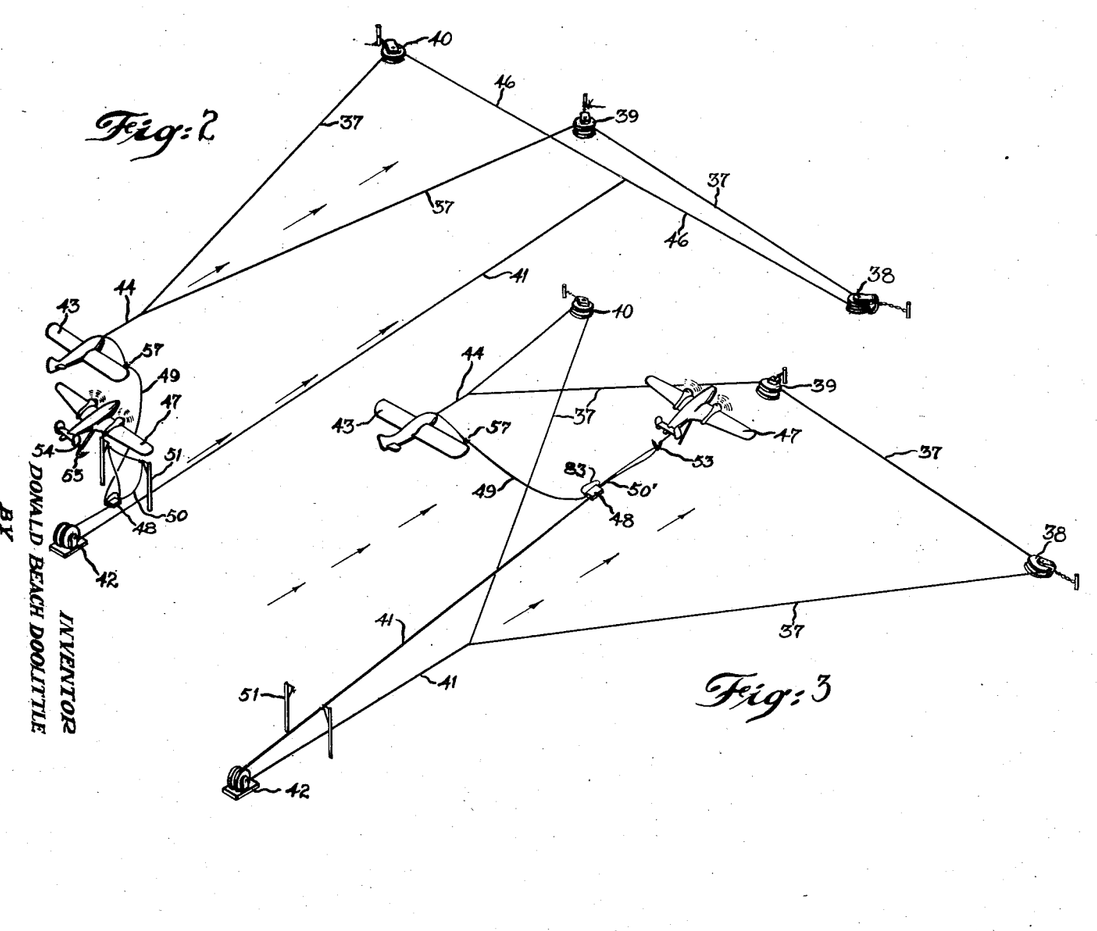
Fig. 2 shows a ground based aircraft accelerating system in which an aircraft in flight is about to pick up a stationary glider.
Fig. 3 shows the apparatus of Fig. 2 after the plane has made contact and the glider is partially accelerated.
Figure 4:
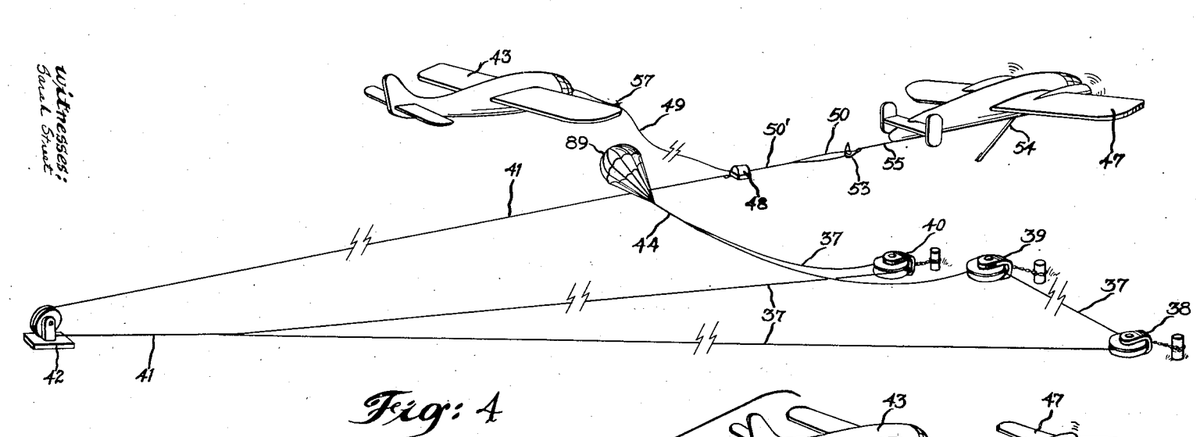
Fig. 4 shows the apparatus of Figs. 2 and 3 immediately after the glider pilot has disconnected the accelerating cable.

Referring to Fig. 2, cable 37 has a length 46 between pulleys 38 and 40 which is located substantially at right angles to the flight path of the tug aircraft 47. Cable 41 is desirably attached at right angles to span or portion 46 of cable 37 at a point substantially midway between pulleys 38 and 40 and is attached at the other end to release 48 after passing over pulley 42.

Likewise attached to release 48 are tow line 49 and pick-up loop 50 which latter attachment may be made indirectly through short leader 50' if desired. Loop 50 is releasably supported in the conventional pick-up ground station illustrated in Fig. 1 having a pair of station poles 51 and releasable loop supports 52. For details of an air pick-up ground station, reference is made to United States Patent No. 2,367,607 in the name of Stuart Crosby Plummer.

The tug or pick-up airplane 47 has a hook 53 releasably depending therefrom and positioned near the end of a pick-up arm 54. Line 55 attached to the hook is secured inside the tug and may cooperate with pulley 56, if desirable. Tow line 49 may be releasably held by one or more clips 57 (see Fig. 25) along the wing of the glider in order to prevent fouling during the initial stages of acceleration.

Figures 6, 7, 8:
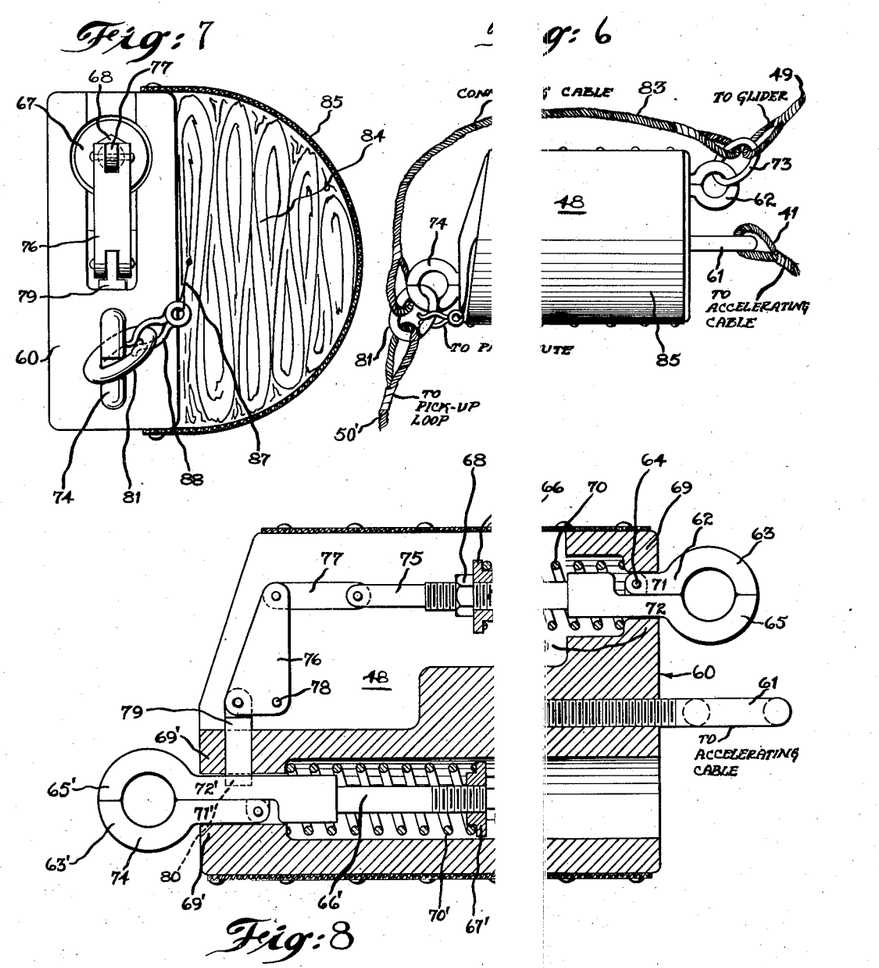
Fig. 6 is an elevation of an automatic cable releasing device.
Figs. 7 and 8 are partly sectional views of the structure of Fig. 6.

Referring now to Figs. 6, 7 and 8, the structure of the release mechanism 48 will be described in detail. This release provides for automatic disengagement of the ground or accelerating cable at the proper time. The release denoted generally by 48 has a housing 60, in which is threaded a fixed eye 61 which in turn is attached to the cable 41. Placed adjacently in the housing 60 is a releasing eye 62 having a jaw 63 pivoted at 64 and a fixed jaw 65. Fixed jaw 65 has a threaded portion 66 on which are located a retaining bushing 67 and nut 68. Between bushing 67 and shoulders 69 of housing 60 is located a helical spring 70 which urges the threaded portion of jaw 65 to the left in Fig. 8. Pivoted jaw has a shank 71 which is complementary to shank 72 of fixed jaw 65. It will be apparent that when the pressure of spring 70 urges the eye 62 to the left in Fig. 8, shoulders 69 of housing 60 prevent jaws 63 and 65 from opening. However, when sufficient tension is exerted upon the eye 62 by ring 73 (see Fig. 6) the spring 70 is compressed and both jaws are withdrawn from housing 60 sufficiently to enable jaw 63 to open and release the ring 73. The construction and operation of eye 74 is similar to that of eye 62 and it is believed unnecessary to repeat the method of operation. However, the construction of the release 48 is such that eye 74 will not release until eye 62 has been pulled out of housing 60. Threaded portion 66 has an extension 75 which connects with lever 76 by means of link 77. Lever 76 is pivoted to housing 60 at 78 and to locking key 79. Key 79 cooperates with a slot 80 in fixed jaw 65' of eye 74. It will be obvious that so long as key 79 is in place in slot 80, eye 74 cannot release; however, as soon as tension is exerted on eye 62 to compress spring 70, key 79 will be withdrawn from slot 80 permitting instant opening of jaws 63' and 65' and consequent release of ring 81.

For the sake of brevity, corresponding parts of eye 62, eye 74 and housing 60 have been designated by primed reference characters.

Referring now to Fig. 6, it will be apparent that so long as tension is exerted between cable 41 and cable 50', the release will not function. However, as soon as tension is exerted on cable 49, eye 62 will be pulled out from the release itself and likewise eye 74 will be released, as explained in detail above. This permits cable 49 to be pulled by cable 50' through connecting cable 83. The manner in which the above function of the release operates will be described hereinafter in conjunction with the operation of the entire system.

Figure 5:
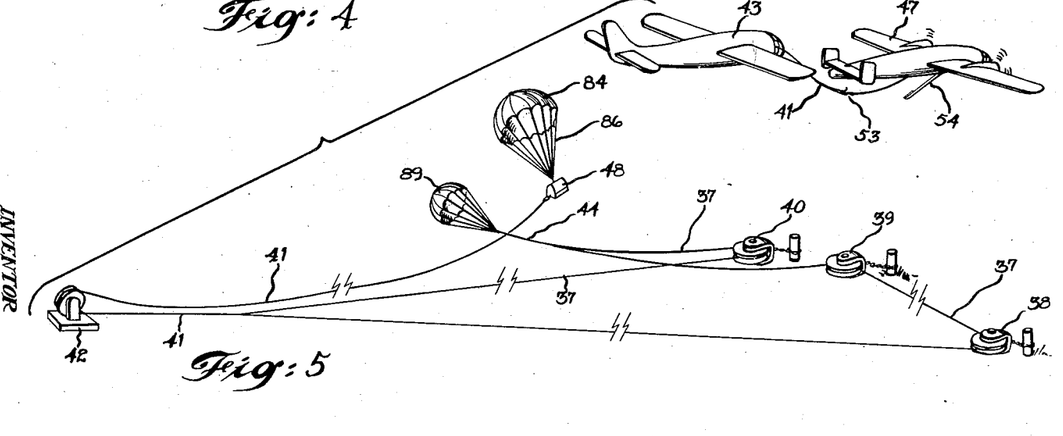
Fig. 5 shows the ground apparatus after the accelerating cable has been detached both from the glider and from the tow line.

Fig. 7 illustrates a parachute 84 which is packed in a parachute case 85 riveted to one side of the release housing 60. The shrouds 86 of the parachute are permanently attached to the housing of the release as shown in Fig. 5. A rip cord 87 is releasably attached to ring 81 by clip 88 so that the parachute 84 will be withdrawn from its container 85 when ring 81 is released from eye 74. The object of the parachute is to permit the release to be dropped gently to the ground avoiding damage to it and twisting of the ground cable. For the same purpose, it may be desirable to attach a second parachute 89 to leader 44 in such a manner that when the glider pilot releases leader 44, it will descend more gradually to the ground thereby avoiding snarling.

The launching operation is thus completed and the tug and towed aircraft may proceed as in normal towing operations. It will be understood that my system may readily be adapted to launch any object for pick-up and subsequent towing by an aircraft. Although I have preferred to illustrate a powerless aircraft, such as a glider, the system may also be used to launch a powered aircraft or to assist in the launching of one. The use of this system for objects other than aircraft will be more fully described hereinafter. By varying the number and relation of anchors and pulleys used in my system a limitless range of both initial and final accelerations may be achieved and it will be appreciated that I have not attempted to show every combination possible. The foregoing description taken together with the theoretical discussion and further described embodiments of the invention is believed to be adequate to teach one skilled in the art how to construct a span launching system capable of achieving any desired result.

Figure 10:
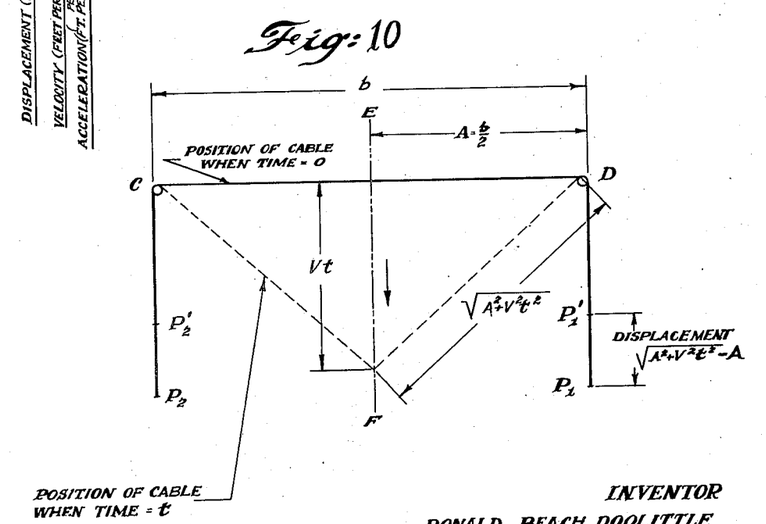
Fig. 10 is a vector diagram of a typical ground installation set up.

The basic principle of launching aircraft according to this invention may be best explained by the vector diagram shown in Fig. 10. The span between points c and d is represented by b, and half span $$\frac{b}{2}$$

is represented by A. Flight path of the airplane will be along line E—F perpendicular to and midway on the span b. The airplane contacts the span at its midpoint and displaces it a distance $Vt$, where V is a constant velocity and $t$ is time. Then by geometry, half of the span increases in length to a value of $\sqrt{A^2+V^2t^2}$. The points $P_1$ and $P_2$, to which the accelerated object will be attached, will then be displaced $$P_2-P_{2'}=P_1-P_{1'}=\sqrt{A^2+V^2t^2}-A$$

The velocity of the points may now be expressed:

$$V_p=\frac{ds}{dt}=\frac{V^2t}{(A^2+V^2t^2)^{1/2}}$$

The acceleration of points $P_1$ and $P_2$ may be expressed:

$$a=\frac{dV_p}{dt}=\frac{d^2s}{dt^2}=\frac{A^2V^2}{(A^2+V^2t^2)^{3/2}}$$

Figure 9:
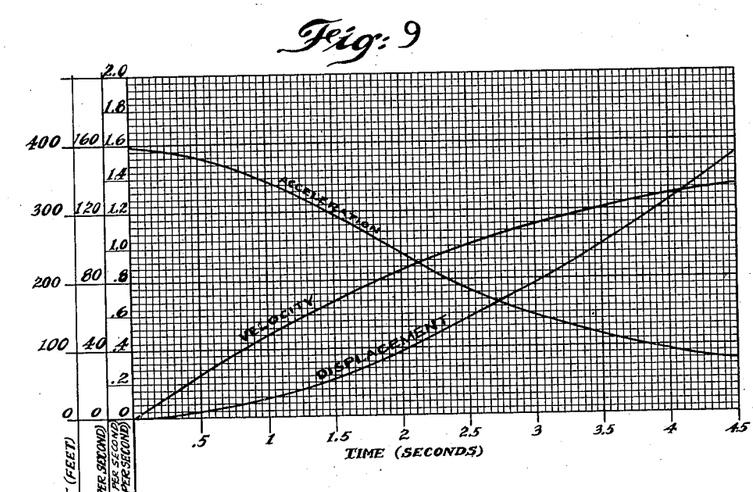
Fig. 9 shows typical acceleration, velocity, and displacement curves of a glider launched according to my invention.

A typical set of curves for displacement, velocity, and acceleration plotted against time are shown in Fig. 9, calculated from the above equation, for a velocity of 160 feet per second and a span of 1,000 feet.

The same formulae apply to the operation of the reverse span effect which is present between pulleys 39 and 40 in Figs. 2 and 3. As the glider 43 approaches these pulleys, the accelerating effect becomes increasingly great in accordance with well known principles of physics and is similar to a giant slingshot.

Figure 11:
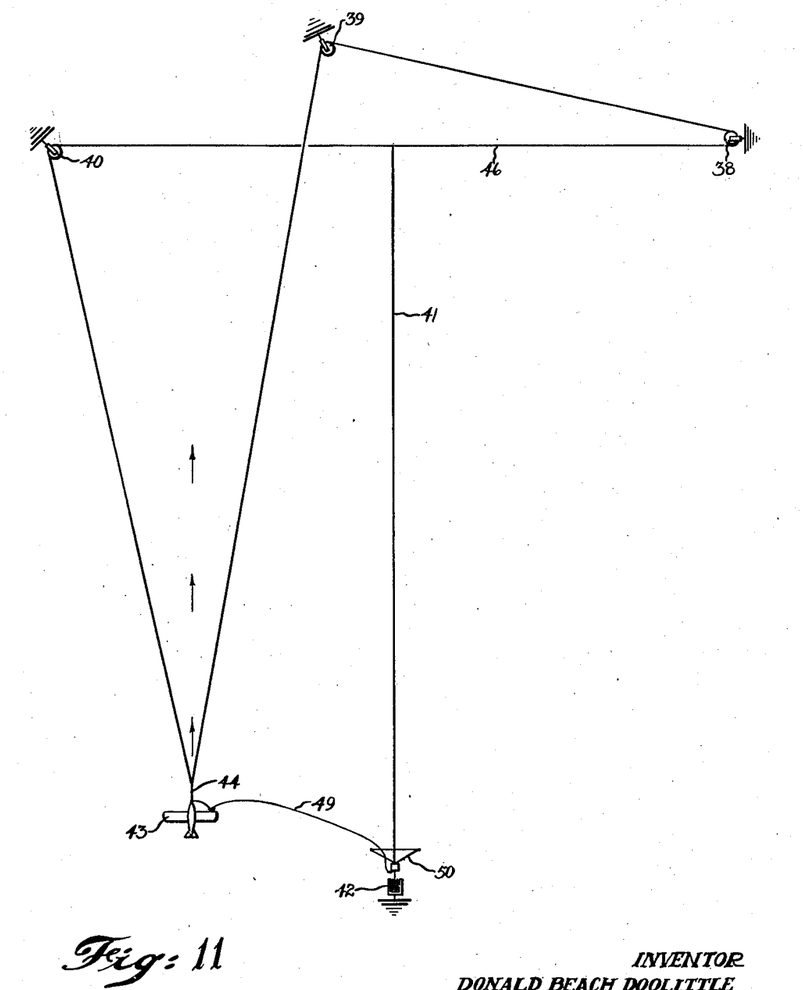
Fig. 11 is a plan view of the ground station and equipment of Fig. 2.

Fig. 11 is a plan view of the preferred form of a span accelerating system designed to incorporate the action of a first span between pulleys 38 and 40 which permits slow initial movement of glider 43 with relatively great displacement of cable 41. Combined with the initial span effect, is the reverse span effect of pulleys 39 and 40 which controls the final acceleration of the glider. The lay-out of the pulleys according to Fig. 11 provides maximum freedom from possible fouling of tow line 49, cable 41 and the glider. Slower initial acceleration may be accomplished by the use of an additional pulley 90 (Fig. 12) attached to the span between pulleys 38 and 40. In this view, pulley 39 is relocated in a slightly different position with respect to pulley 40 in order to reduce the final acceleration of the glider 43. Cable 41, instead of having one end fixed to span 46, has one end anchored at 91, in order to impart one-half the velocity of the tug to span 46 instead of full tug velocity as shown in Fig. 11.

A launching system such as that illustrated in Figs. 11, 12, 13, 15, 16, 17 having an accelerating cable 41, 41', 101, 104, 110 requires special devices to accelerate the cable. This result may be conveniently accomplished by providing an accelerating cable constructed of nylon or similar synthetic plastic material having inherent shock absorbing characteristics.

Figure 12:
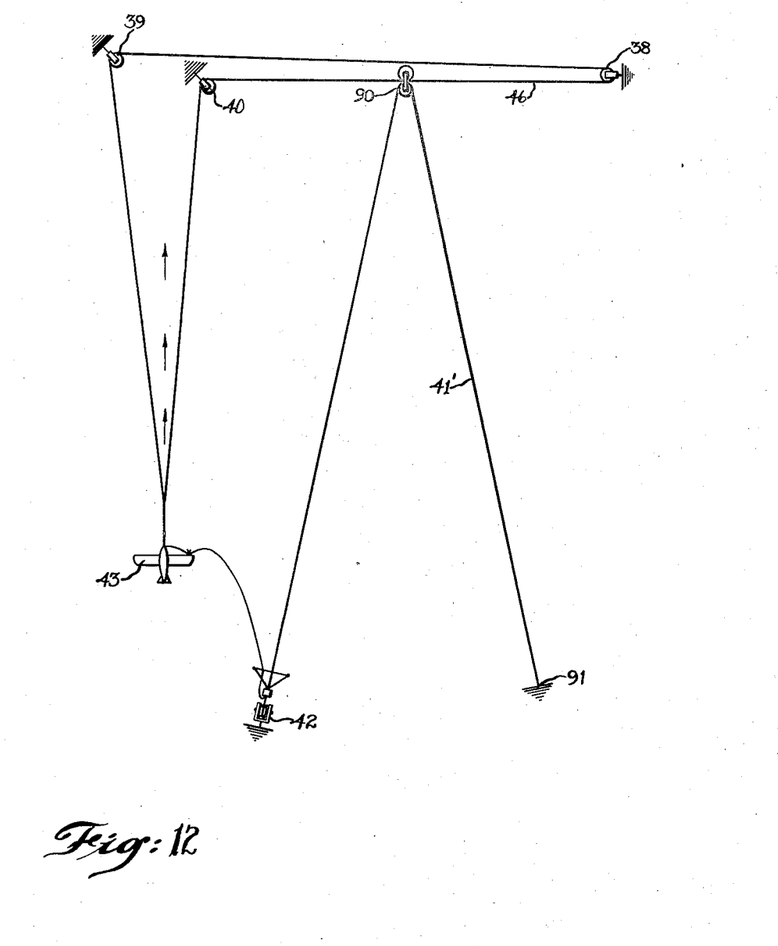
Fig. 12 is a plan view of a ground station set up similar to Fig. 11 but using five pulleys instead of four.
Figures 13, 14, 25:
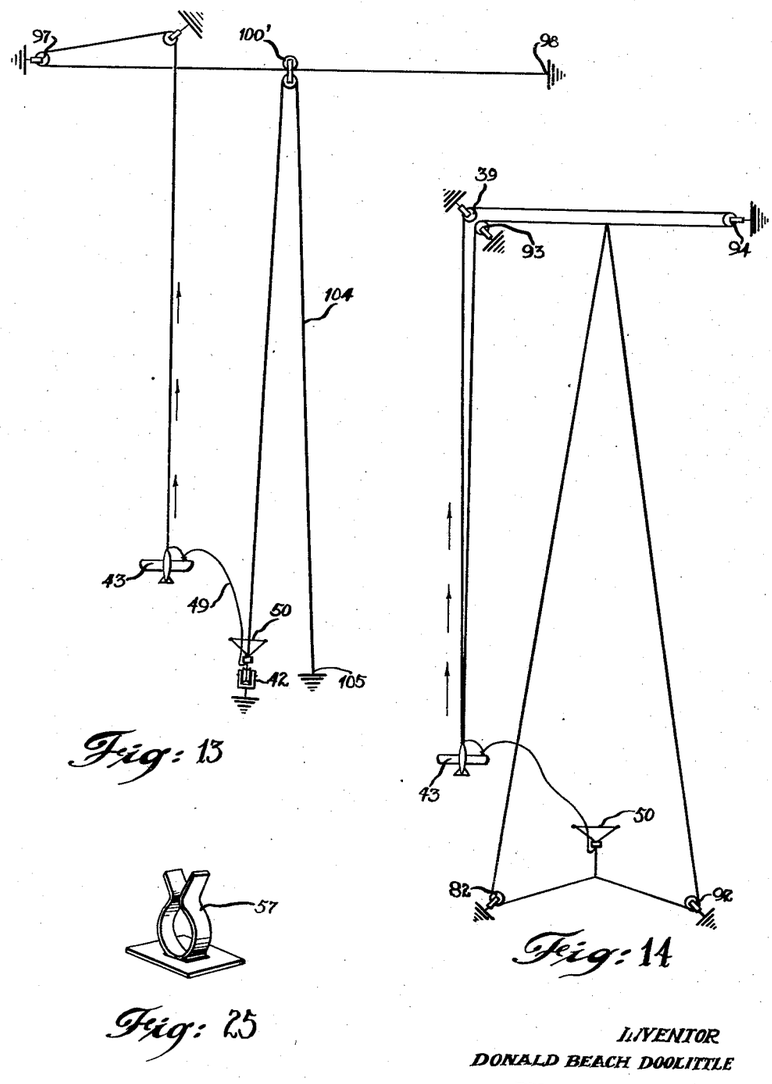
Figs. 13 to 17 show variations of ground equipment for obtaining different accelerating characteristics.
Fig. 25 is a detail of a releasable clip for securing the tow line preparatory to launching.
Figures 15, 16:
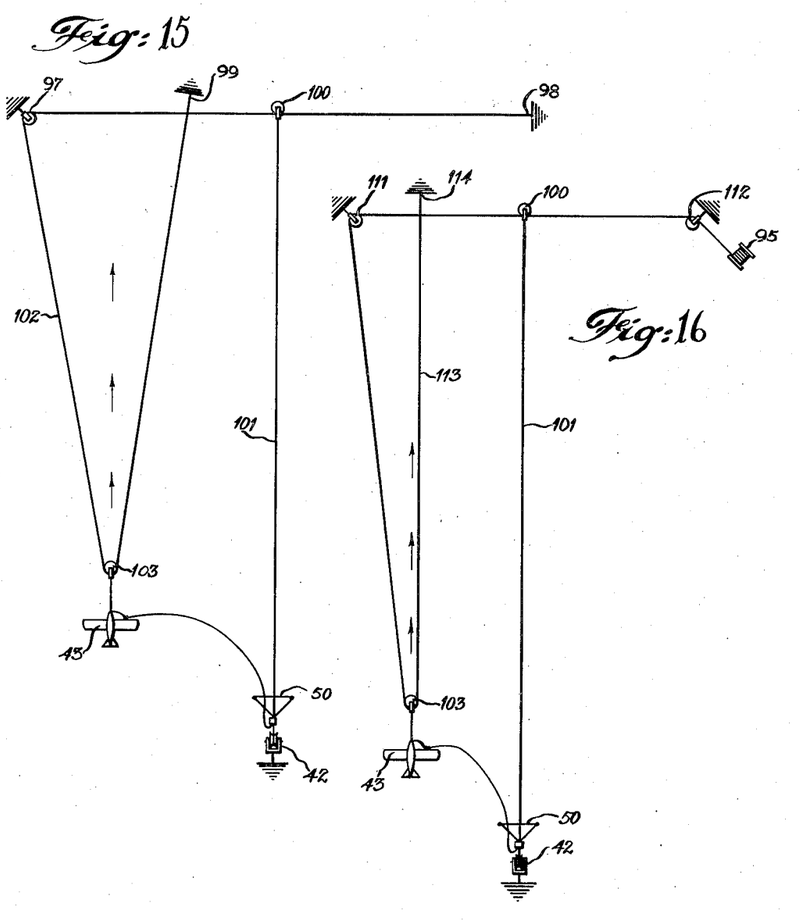
Figures 17, 18:
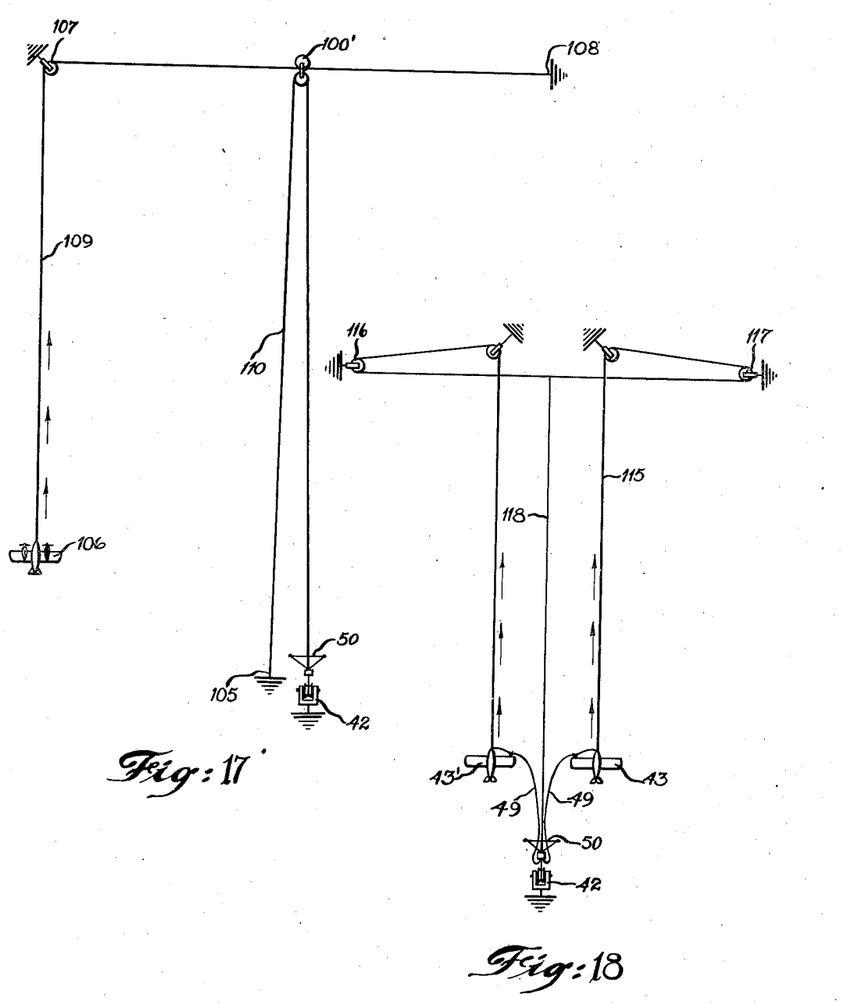
Fig. 18 shows a system adapted to the acceleration of two gliders simultaneously.

Examples of such materials are vinyl chloride, vinylidene chloride, rubber hydrochloride and others having hysteresis on the order of 20 per cent or greater. A comparison of Figs. 12 and 13, for example, shows how initial acceleration can be controlled by varying the angle at which the accelerating cable is attached to the primary span. Formulae for calculating the effect of this angle appear hereinafter.

Where ground space is extremely limited, a double span may be employed, as shown in Fig. 14, in which the first span between pulleys 82 and 92 serves to operate the second span between pulleys 93 and 94. It will thus be apparent that the accelerating cable for any type of span system may be either single, double, or looped. The types of span proper which are attached to the glider or aircraft to be accelerated fall into three categories. First, the endless or loop form shown in Figs. 11, 12, 14, 19, 20, 21, 22. The second category employs an anchor in the primary span and is illustrated by Figs. 13, 15, 17. The third type is in reality the anchored variety but in addition provides what is in effect a partial anchor or means for gradual pay out of one one or both ends of the span. Such a system is illustrated in Fig. 16 which has a controlled pay-out drum or winch 95 of any well known design or the winch may be of the special type disclosed and claimed in S. C. Plummer Patent No. 2,373,413.

Fig. 18 illustrating a system for launching two gliders simultaneously is of the partially anchored type since the inertia of the gliders acts in the same manner as the controlled pay-out of the winch.

Figure 19:
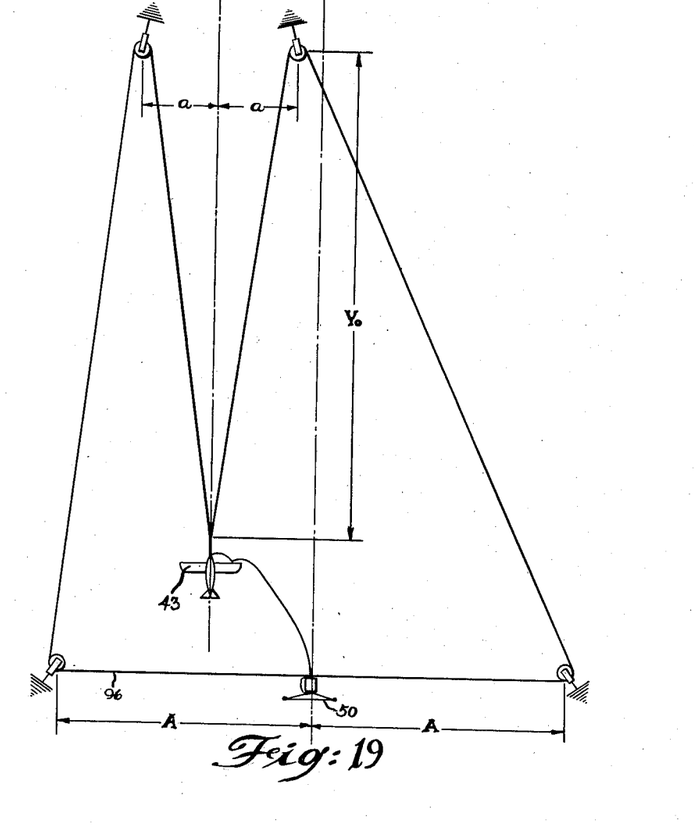
Fig. 19 shows a modified form of pulley and cable arrangement.

The simplest form of a span is the endless type shown in Fig. 19 and the equations for this form, assuming the cable to be rigid, are as follows:

1. Displacement of glider—

$$Y=Y_0-\sqrt{(\sqrt{Y_0^2+a^2}-\sqrt{A^2+v^2t^2}+A)^2-a^2}$$

2. Velocity of glider—

$$\frac{dy}{dt}=V=\frac{V^2t[\sqrt{Y_0^2+a^2}-\sqrt{A^2+v^2t^2}+A]}{\sqrt{A^2+v^2t^2}\sqrt{(\sqrt{Y_0^2+a^2}-\sqrt{A^2+v^2t^2}+A)^2-a^2}}$$

3. Acceleration of glider—

$$\frac{d^2Y}{dt^2}=a=\frac{V^2\sqrt{A^2+v^2t^2}[\sqrt{Y_0^2+a^2}-\sqrt{A^2+v^2t^2}+A)^2-a^2]\times[\sqrt{A^2+v^2t^2}(\sqrt{Y_0^2+a^2}-\sqrt{A^2+v^2t^2}+A^2)\ v^2t^2]}{(A^2+v^2t^2)^{3/2}[(\sqrt{Y_0^2+a^2}-\sqrt{A^2+v^2t^2}+A)^2-a^2]^{3/2}}+$$

$$\frac{v^4t^2[\sqrt{Y_0^2+a^2}-\sqrt{A^2+v^2t^2}+A]\times[(\sqrt{Y_0^2+a^2}-\sqrt{A^2+v^2t^2}+A)(\sqrt{A^2+v^2t^2})-(\sqrt{Y_0^2+a^2}-\sqrt{A^2+v^2t^2}+A)^2+a^2]}{(A^2+v^2t^2)^{3/2}[(\sqrt{Y_0^2+a^2}-\sqrt{A^2+v^2t^2}+A)^2-a^2]^{3/2}}$$

4. Tension in cable—

$$T=\frac{w}{2g}\frac{d^2Y}{dt^2}\cdot\frac{\sqrt{Y_0^2+a^2}-\sqrt{A^2+v^2t^2}+A}{\sqrt{(\sqrt{Y_0^2+a^2}-\sqrt{A^2+v^2t^2}+A)^2-a^2}}$$

5. Force on airplane—

$$F=\frac{w}{g}\frac{d^2Y}{dt^2}\cdot\frac{\sqrt{Y_0^2+a^2}-\sqrt{A^2+v^2t^2}+A}{\sqrt{(\sqrt{Y_0^2+a^2}-\sqrt{A^2+v^2t^2}+A)^2-a^2}}\cdot\frac{vt}{\sqrt{A^2+v^2t^2}}$$

In actual practice there would be a possibility that cable 96 (Fig. 19) might foul the glider during acceleration, and therefore, the set-up shown in Fig. 11 is preferable since this possibility has been eliminated. The working of the system, insofar as acceleration and velocity are concerned, is the same as that of Fig. 19, both being of the endless variety.

As already explained, the initial velocity may be reduced to one-half airplane velocity since the velocity at which the span is pulled is on this order. At the start of acceleration, the distance between pulleys 42 and point 91 (Fig. 12) makes cable 41 act as a reverse span and accelerates pulley 90 to airplane velocity as it approaches pulley 42 and anchor 91.

Fig. 15 illustrates the basic anchor system having a span between pulley 97 and cable anchor 98. The other end of the primary span is also anchored at 99. Pulley 100 connects accelerating cable 101 to loop 50. The span cable 102 passes around a pulley 103 at the nose of the glider 43. In this system the velocity of the span cable around pulley 97 will be twice the velocity obtained in the endless type of span because the final velocity of the cable around pulley 97 approaches twice the velocity of the tug airplane. Pulley 103 is, therefore, provided to reduce the final glider velocity to approximately airplane velocity.

It will be apparent that the high velocity of cable 102 over pulley 97 may render the set-up of Fig. 15 undesirable for certain types and weights of equipment and to eliminate this feature the system of Fig. 13 may be employed to reduce the high velocity at pulley 97. Accordingly, in the system of Fig. 13, accelerating cable 104 which is anchored at one end at anchor 105, passes through pulleys 100' and 42 to loop 50. Thus, acceleration of the span between pulley 97 and anchor 98 is reduced to one-half airplane velocity in accordance with well known principles of physics.

Fig. 17 illustrates how a very simple anchor span type of system may be employed to assist in the take-off of powered aircraft 106. This system employs a primary span between pulley 107 and anchor 108 and is not subject to the space limitation imposed by a connection between the aircraft and pick-up loop 50. The pilot of airplane 106 can release primary span cable 109 any time he has obtained sufficient altitude and flying speed. Accelerating cable 110 is anchored at 105 in the same manner as in Fig. 13. Here again the distance between anchor 105 and pulley 42 may be widened as shown in Fig. 12 to suit the particular conditions desired.

The partially anchored system illustrated in Fig. 16 has its primary span between pulleys 111 and 112. Primary cable 113 is anchored at one end at 114 and is wound on winch 95 at the other end. It also passes over pulley 103 at the nose of the glider 43, the same as in Fig. 15. Any cable forces in excess of the brake setting of the winch 95 will cause pay-out. The use of such a system permits a shorter span between pulleys 111 and 112, thereby decreasing space requirements.

Limited pay-out of each end of the primary span 115 (Fig. 18) is accomplished by attaching a second glider 43' to the other end of the span. A pair of leaders 49 connects each glider to loop 50. The effective primary span is obtained between pulleys 116 and 117. Accelerating cable 118 connects loop 50 and the primary cable 115. The technique of disconnecting the lines from gliders 43 and 43' will follow the previously described technique with respect to a single glider.

Figures 20, 21:
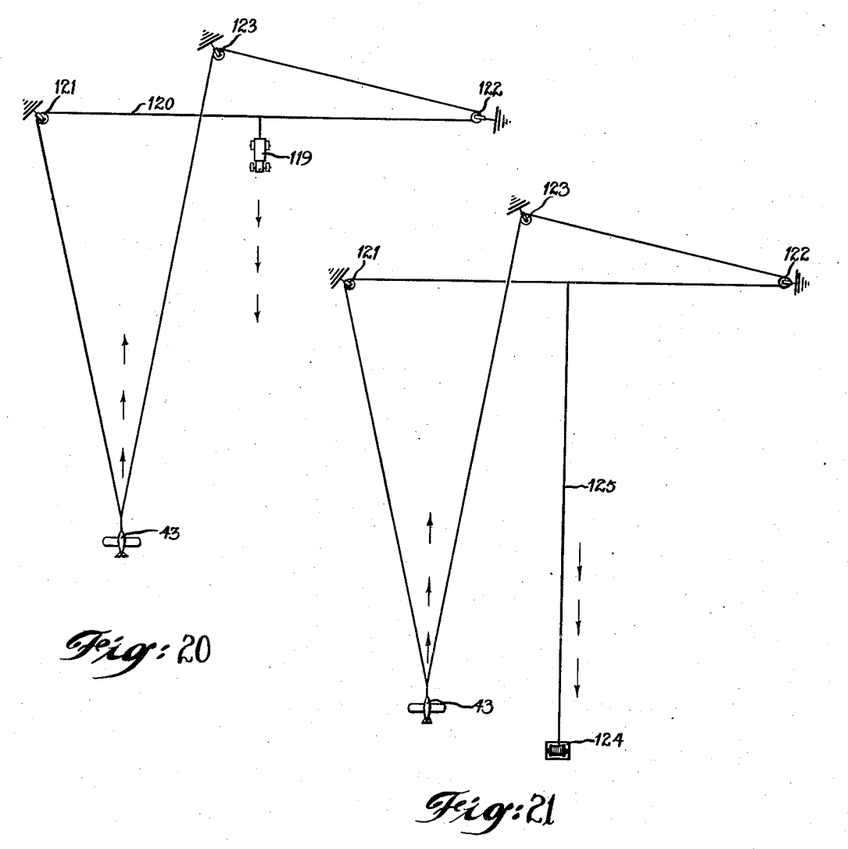
Fig. 20 shows a glider launching system in which a moving vehicle on the ground imparts the accelerating force.
Fig. 21 shows the glider accelerating apparatus of Fig. 20 using a power driven winch.
Figures 22, 23, 24:
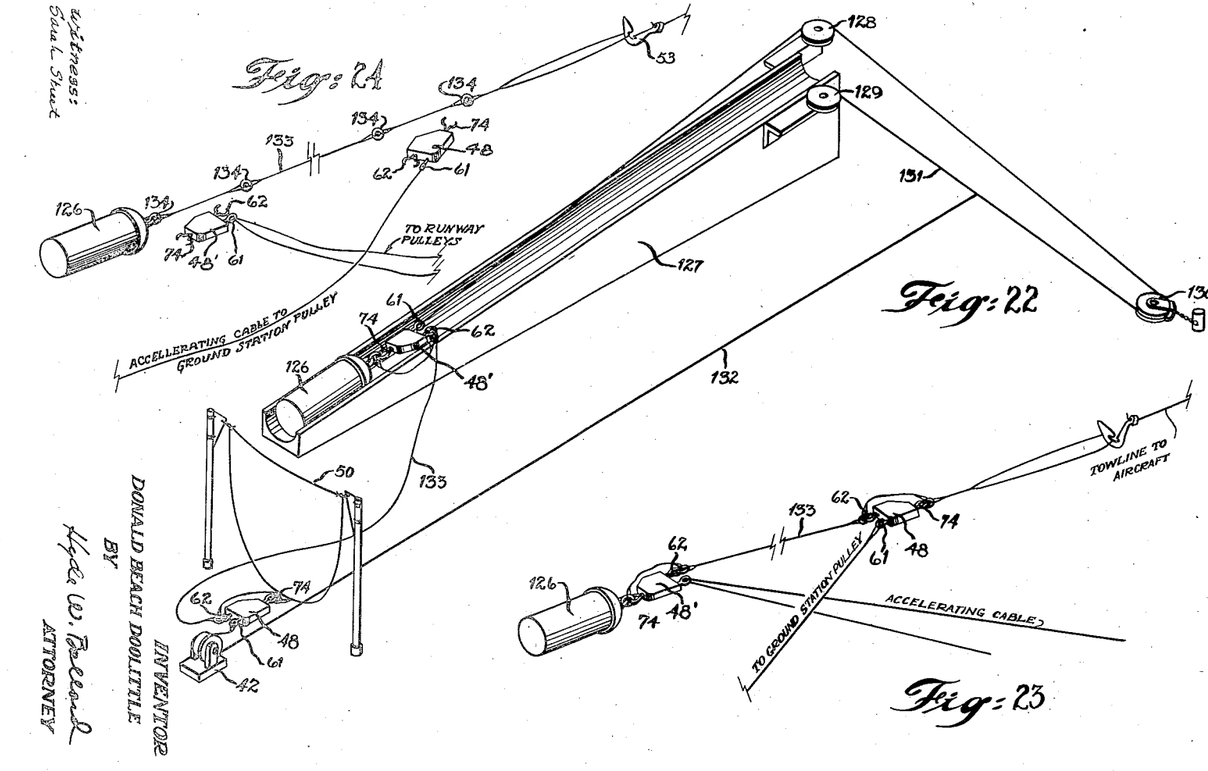
Fig. 22 shows the launching system of Fig. 2 adapted to accelerate objects other than gliders.
Fig. 23 shows the towing and accelerating cable just before the accelerating cable becomes detached.
Fig. 24 shows the cargo container being towed in full flight and the accelerating cables just after detachment.

If desired, a glider may be effectively launched by means of a span system with the use of energy imparted devices other than another aircraft in flight. Such a system is illustrated in Figs. 20 and 21. Automotive vehicle 119 is connected to primary span 120 between pulleys 121 and 122. One leg of the span, which is of the endless variety, is led back over pulley 123 to provide sufficient clearance for the automobile. It will be readily apparent that the span system permits the automobile or truck 119 to attain a sufficient velocity from a standing start to accelerate glider 43 in accordance with the equations set forth above. In this system, a reverse span effect takes place as glider 43 approaches pulleys 121 and 123. A similar result can be obtained by use of a powered winch 124 (Fig. 21) and an accelerating cable 125 in place of automobile 119.

Where it is desired to pick-up or launch cargo rather than another aircraft, the system illustrated in Figs. 22–24 may be employed. Cargo container 126 is placed near the bottom of an inclined chute 127 to which are attached pulleys 128 and 129 corresponding to pulleys 39 and 40 in Figs. 1 and 2. Pulley 130 is anchored in any convenient manner to provide a primary span 131 between pulleys 129 and 130. Accelerating cable 132 is attached to primary span 131 and passes over pulley 42 to release 48. The leader 133 connects release 48 to a second automatic release 48' attached to the nose of the container 126. The automatic functioning of releases 48 and 48' to permit acceleration of the container and its release at the proper time, requires that the container tow line 133 contain a series of rings 134, to which are attached the jaws 74 of the release 48. As previously explained, in connection with Figs. 6, 7 and 8, initial pull on ring 61 will be transmitted through the release 48 to ring 74 until stress is applied to ring 62 through line 133. This stress on ring 62 releases all jaws of ring 62 and the jaws of ring 74, as shown in Fig. 24.

Referring now to Fig. 22, it will be understood that when tension is applied to loop 50 by means of the pick-up hook 53, release 48 will pull on accelerating cable 132, whereas, tow line 133 will be slack. Tension is, therefore, applied through cable 132 and 131 to second release 48' which is releasably attached to tow line 133 at two points. So long as stress is transmitted through cable 132 and 131, ring 74 and ring 62 will not open but at a point before container 126 reaches the end of trough 127 tension will come on tow line 133 due to its predetermined length thus releasing ring 74 and ring 62 on both releases 48 and 48'. In this way, a cargo can be picked up and accelerated to aircraft speed without requiring any shock absorbing equipment in the aircraft.

It will be understood that the system of Figs. 22–24 is inherently the same as the endless span system of Fig. 11 except that the absence of a pilot in the glider has necessitated the introduction of a second automatic releasing device since the pilot would ordinarily actuate the release on the glider to the accelerating cable.

I have thus described a novel system for transferring energy from an object moving at high velocities to an initially stationary object, whereby the stationary object is given a velocity comparable to that of the moving object. Furthermore, I have disclosed how this system can be adapted to impart any desired initial and final acceleration to the object to which motion is being imparted.

The system requires a minimum of ground equipment and is adapted to a non-permanent installation. Its several forms can readily be adapted to be used in a number of different space requirements.

Having thus described my invention, I claim:

1. In a launching system for aircraft, a launching aircraft, an aircraft to be launched, a depending hook on the launching aircraft, a line connecting said hook to said launching aircraft, a loop releasably supported by a pair of ground station poles, a length of line supported at right angles to the flight path of the launching aircraft, pulley means for supporting and tensioning said line, a connection between said line and said loop, a connection between the line and the aircraft to be launched, means for automatically disconnecting the loop and the line from said aircraft to be launched, and a parachute secured to the disconnecting means for opening the parachute upon release of the line.

2. In apparatus for accelerating an object from a moving object, a pair of spaced pulleys, an idler pulley, an endless cable passing around the pulleys, an object to be launched, connecting means between the object to be launched and the cable, a length of said cable being taut between two of the pulleys and another length of said cable being taut between the object to be launched and two of said pulleys, and a connection between the taut length of line and said moving object.

3. A span system for launching aircraft comprising an aircraft to be launched, a launching aircraft, a pair of fixed pulleys located substantially forward of said aircraft to be launched, an endless cable passing through said pulleys to form a taut primary span between said pulleys, a third pulley generally in line with the pair of pulleys, a secondary span formed between one of the pair of pulleys and the third pulley, a connection between the secondary span and the aircraft to be launched, a pick-up station located midway of and spaced from the taut span, a loop supported on said pick-up station, means on said launching aircraft to engage said loop a towing connection between the loop and said primary span, and a releasable connection between the loop and the primary span.

4. In a launching system for aircraft, a launching aircraft, an aircraft to be launched, a depending hook on the launching aircraft, a line connecting said hook to said aircraft, a loop releasably supported by a pair of ground station poles, a stretched primary span for imparting initial acceleration to the aircraft to be launched, a connection between the loop and the primary span, a secondary span for imparting final acceleration to the aircraft to be launched and connected to said primary span, the secondary span becoming taut as the primary span becomes extended, and connecting means from the secondary span to said aircraft to be launched.

5. In a system for imparting acceleration to an object, an object to be accelerated, a primary span, a secondary span connected to said object and said primary span, anchored pulleys for positioning the spans, a moving object for applying force to said primary span, means for controlling the rate of application of said force to said primary force including an anchor, an accelerating cable attached to said anchor, a movable pulley attached to and slidable on said primary span, and means for connecting the moving object to the cable, said cable being threaded from the anchor through said movable pulley to the connecting means.

6. A span system for launching an object comprising a launching aircraft, an object to be launched, a pair of pulleys located substantially forward of said aircraft to be launched, an endless cable passing through said pulleys to form a taut primary span between said pulleys, a third pulley generally in line with the said pair of pulleys, a secondary span formed between one of the pair of pulleys and the third pulley, a connection between the secondary span and the object, a pick-up station located midway and spaced from the taut span, a loop supported on said pick-up station and adapted to be engaged by said launching aircraft, a towing connection between the loop and said primary span, and a releasable connection between the object and the secondary span.

7. In a system for imparting acceleration to an object, an object to be accelerated, a primary span, a releasable connection between the primary span and the object to be accelerated, an accelerating span attached near the midpoint of the primary span, means for positioning the primary and accelerating spans including a plurality of pulleys, and means for imparting force from a moving object to the accelerating span.

8. In a launching system for aircraft, a launching aircraft, an aircraft to be launched, a depending hook on the launching aircraft, a line connecting said hook to said launching aircraft, a loop releasably supported by a pair of ground station poles and adapted to be engaged by said hook, a span, an anchor for one end of the span, a pulley at the other end of the span, a connection between the end of span passing over the pulley and the aircraft to be launched, a pulley releasably attached to the aircraft to be launched, and a second anchor to which the connection is attached after passing through the pulley on the aircraft to be launched.

9. In a launching system for aircraft, a launching aircraft, an object to be launched, a depending hook on the launching aircraft, a line connecting said hook to said aircraft, a loop releasably supported by a pair of ground station poles and adapted to be engaged by said hooks, a stretched primary span for imparting initial acceleration to the object to be launched, a connection between the loop and the primary span, a secondary span for imparting final acceleration to the object to be launched, a connection between said primary and secondary spans the secondary span becoming taut as the primary span becomes extended, and connecting means from the secondary span to the object.

10. Apparatus according to claim 9 in which at least a part of the connection between the spans and the launching aircraft is comprised of a synthetic plastic material having more than twenty per cent hysteresis.

DONALD BEACH DOOLITTLE.

REFERENCES CITED

The following references are of record in the file of this patent:

UNITED STATES PATENTS

| Number | Name | Date |
|---|---|---|
| 2,343,892 | Dodge | Mar. 14, 1944 |
| 2,369,518 | Ballard | Feb. 13, 1945 |
| 2,371,635 | McClure | Mar. 20, 1945 |
| 2,399,196 | Bolster | Apr. 30, 1946 |

FOREIGN PATENTS

| Number | Country | Date |
|---|---|---|
| 41,776 | France | Jan. 16, 1933 |
| | (Addition to No. 729,189) | |
| 681,687 | France | Feb. 3, 1930 |
| 292,826 | Great Britain | June 28, 1928 |